(12) United States Patent
Ruckart

(10) Patent No.: US 7,929,675 B2
(45) Date of Patent: *Apr. 19, 2011

(54) VISUAL CALLER IDENTIFICATION

(75) Inventor: John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1254 days.

This patent is subject to a terminal disclaimer.

(21) Appl. No.: 11/490,390

(22) Filed: Jul. 20, 2006

(65) Prior Publication Data

US 2006/0256938 A1  Nov. 16, 2006

Related U.S. Application Data

(63) Continuation of application No. 09/888,832, filed on Jun. 25, 2001, now Pat. No. 7,085,358.

(51) Int. Cl.
*H04M 1/56* (2006.01)
*H04M 1/64* (2006.01)
*H04M 3/42* (2006.01)

(52) U.S. Cl. .................. 379/142.06; 379/88.19; 455/415

(58) Field of Classification Search . 379/142.01–142.18
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Verhoeven | |
| 4,649,533 A | 3/1987 | Chorley et al. | |
| 4,663,777 A | 5/1987 | Szeto | |
| 4,674,115 A | 6/1987 | Kaleita et al. | |
| 4,698,839 A | 10/1987 | DeVaney et al. | |
| 4,791,664 A | 12/1988 | Lutz et al. | |
| 4,797,911 A | 1/1989 | Szlam et al. | |

(Continued)

FOREIGN PATENT DOCUMENTS

EP  0821511  1/1998

(Continued)

OTHER PUBLICATIONS

AASTRA Telecom, Press Release, Aastra Telecom Introduces CNX Conference Bridge, Aug. 29, 2005, 1 page.

(Continued)

*Primary Examiner* — Fan Tsang
*Assistant Examiner* — Solomon Bezuayehu
(74) *Attorney, Agent, or Firm* — Cantor Colburn LLP

(57) ABSTRACT

A visual caller identification system and method are provided. A caller identification device of a called party's telephone includes a series of colored lights for visually alerting the called party to an incoming call. The called party may program the caller identification device so that a first colored light flashes any time the caller ID identifies information known to the called party. A second light flashes any time caller identification information is provided, but where the information is unknown to the called party. And, a third colored light flashes any time the caller identification is not provided (e.g., private, unlisted). The called party may look at the telephone for a quick screening without having to go to the telephone to read the caller ID when it rings. Alternatively, caller identification information to be displayed may be projected onto a projection surface, such as a wall in the called party's home.

12 Claims, 4 Drawing Sheets

U.S. PATENT DOCUMENTS

| | | |
|---|---|---|
| 4,802,202 A | 1/1989 | Takahashi et al. |
| 4,817,133 A | 3/1989 | Takahashi et al. |
| 4,823,304 A | 4/1989 | Frantz et al. |
| 4,845,743 A | 7/1989 | Lutz |
| 4,850,013 A | 7/1989 | Rose |
| 4,850,103 A | 7/1989 | Takemoto et al. |
| 4,995,075 A | 2/1991 | Angiolillo-Bent et al. |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow et al. |
| D338,889 S | 8/1993 | Fuqua et al. |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | De Framond |
| 5,467,388 A | 11/1995 | Redd, Jr. et al. |
| 5,475,748 A | 12/1995 | Jones |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew et al. |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. |
| 5,703,934 A | 12/1997 | Zicker et al. |
| 5,703,943 A | 12/1997 | Otto |
| H1714 H | 3/1998 | Partridge |
| 5,724,412 A | 3/1998 | Srinivasan |
| 5,734,706 A | 3/1998 | Windsor et al. |
| 5,742,668 A | 4/1998 | Pepe et al. |
| 5,742,905 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan et al. |
| 5,802,160 A | 9/1998 | Kugell et al. |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi |
| 5,859,903 A | 1/1999 | Lee |
| 5,872,834 A | 2/1999 | Teitelbaum |
| 5,872,934 A | 2/1999 | Whitehouse et al. |
| 5,875,239 A | 2/1999 | Koralewski et al. |
| 5,878,036 A | 3/1999 | Spartz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,918,213 A | 6/1999 | Bernard et al. |
| 5,923,744 A | 7/1999 | Cheng et al. |
| 5,930,701 A | 7/1999 | Skog |
| 5,940,484 A | 8/1999 | DeFazio et al. |
| 5,943,416 A | 8/1999 | Gisby |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,005,870 A | 12/1999 | Leung et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,180 A | 2/2000 | Kass |
| 6,021,427 A | 2/2000 | Spagna et al. |
| 6,031,899 A | 2/2000 | Wu |
| 6,044,148 A | 3/2000 | Bleile |

| Patent No. | Kind | Date | Inventor(s) |
|---|---|---|---|
| 6,049,291 | A | 4/2000 | Kikinis |
| 6,058,171 | A | 5/2000 | Hoopes |
| 6,061,434 | A | 5/2000 | Corbett |
| 6,061,566 | A | 5/2000 | Friman |
| 6,064,876 | A | 5/2000 | Ishida et al. |
| 6,065,844 | A | 5/2000 | Chen |
| 6,072,859 | A | 6/2000 | Kong |
| 6,078,581 | A | 6/2000 | Shtivelman et al. |
| 6,091,947 | A | 7/2000 | Sumner |
| 6,094,478 | A | 7/2000 | Shepherd et al. |
| 6,094,573 | A | 7/2000 | Heinonen et al. |
| 6,094,574 | A | 7/2000 | Vance et al. |
| 6,094,575 | A | 7/2000 | Anderson et al. |
| 6,101,246 | A | 8/2000 | Heinmiller et al. |
| 6,104,784 | A | 8/2000 | Robbins |
| 6,104,800 | A | 8/2000 | Benson |
| 6,108,630 | A | 8/2000 | Kuechler et al. |
| 6,111,939 | A | 8/2000 | Brabanec |
| 6,134,235 | A | 10/2000 | Goldman et al. |
| 6,134,311 | A | 10/2000 | Ekstrom |
| 6,137,870 | A | 10/2000 | Scherer |
| 6,137,871 | A | 10/2000 | Maier et al. |
| 6,141,341 | A | 10/2000 | Jones et al. |
| 6,141,409 | A | 10/2000 | Madoch et al. |
| 6,144,644 | A | 11/2000 | Bajzath et al. |
| 6,154,531 | A | 11/2000 | Clapper |
| 6,160,876 | A | 12/2000 | Moss et al. |
| 6,161,021 | A | 12/2000 | Akpa |
| 6,163,595 | A | 12/2000 | Parker et al. |
| 6,163,607 | A | 12/2000 | Bogart et al. |
| 6,163,691 | A | 12/2000 | Buettner et al. |
| 6,167,254 | A | 12/2000 | Chavez, Jr. et al. |
| 6,169,911 | B1 | 1/2001 | Wagner et al. |
| 6,173,049 | B1 | 1/2001 | Malik |
| 6,178,232 | B1 | 1/2001 | Latter et al. |
| 6,181,928 | B1 | 1/2001 | Moon |
| D437,879 | S | 2/2001 | Weinandt |
| 6,185,289 | B1 | 2/2001 | Hetz et al. |
| 6,192,115 | B1 | 2/2001 | Toy et al. |
| 6,192,116 | B1 | 2/2001 | Mayak |
| 6,198,480 | B1 | 3/2001 | Cotugno et al. |
| 6,198,920 | B1 | 3/2001 | Doviak et al. |
| 6,202,023 | B1 | 3/2001 | Hancock et al. |
| 6,219,407 | B1 | 4/2001 | Kanevsky et al. |
| 6,222,826 | B1 | 4/2001 | Faynberg et al. |
| 6,226,367 | B1 | 5/2001 | Smith et al. |
| 6,226,369 | B1 | 5/2001 | Lim et al. |
| 6,226,399 | B1 | 5/2001 | Robinson |
| 6,229,883 | B1 | 5/2001 | Kakizaki et al. |
| 6,230,006 | B1 | 5/2001 | Keenan et al. |
| 6,233,325 | B1 | 5/2001 | Frech et al. |
| 6,236,975 | B1 | 5/2001 | Boe et al. |
| 6,243,448 | B1 | 6/2001 | Corbett et al. |
| 6,243,461 | B1 | 6/2001 | Hwang |
| 6,252,952 | B1 | 6/2001 | Kung et al. |
| 6,256,671 | B1 | 7/2001 | Strentzsch et al. |
| 6,262,987 | B1 | 7/2001 | Mogul |
| 6,266,399 | B1 | 7/2001 | Weller et al. |
| 6,278,704 | B1 | 8/2001 | Creamer et al. |
| 6,278,862 | B1 | 8/2001 | Henderson |
| 6,282,275 | B1 | 8/2001 | Gurbani et al. |
| 6,292,479 | B1 | 9/2001 | Bartholomew et al. |
| 6,292,549 | B1 | 9/2001 | Lung et al. |
| 6,295,502 | B1 | 9/2001 | Hancock et al. |
| 6,301,342 | B1 | 10/2001 | Ander et al. |
| 6,301,350 | B1 | 10/2001 | Henningson et al. |
| 6,304,644 | B2 | 10/2001 | Karnowski |
| 6,310,943 | B1 | 10/2001 | Kowalski |
| 6,311,057 | B1 | 10/2001 | Barvesten |
| 6,317,488 | B1 | 11/2001 | DePond et al. |
| 6,317,781 | B1 | 11/2001 | De Boor et al. |
| 6,324,263 | B1 | 11/2001 | Sherwood et al. |
| 6,324,271 | B1 | 11/2001 | Sawyer et al. |
| 6,327,347 | B1 | 12/2001 | Gutzmann |
| 6,332,021 | B2 | 12/2001 | Latter et al. |
| 6,333,973 | B1 | 12/2001 | Smith et al. |
| 6,337,904 | B1 | 1/2002 | Gisby |
| 6,337,979 | B1 | 1/2002 | Nakayasu |
| 6,339,639 | B1 | 1/2002 | Henderson |
| 6,341,161 | B1 | 1/2002 | Latter et al. |
| 6,345,187 | B1 | 2/2002 | Berthoud et al. |
| 6,347,136 | B1 | 2/2002 | Horan |
| 6,351,637 | B1 | 2/2002 | Lee |
| 6,353,664 | B1 | 3/2002 | Cannon et al. |
| 6,361,637 | B2 | 3/2002 | Martin et al. |
| 6,363,140 | B1 | 3/2002 | Pinard |
| 6,363,411 | B1 | 3/2002 | Dugan et al. |
| 6,363,664 | B1 | 4/2002 | Brutsaert |
| 6,366,661 | B1 | 4/2002 | Devillier et al. |
| 6,366,772 | B1 | 4/2002 | Arnson |
| 6,377,807 | B1 | 4/2002 | Iparrea et al. |
| 6,377,979 | B1 | 4/2002 | Yamashita et al. |
| 6,389,124 | B1 | 5/2002 | Schnarel et al. |
| 6,389,132 | B1 | 5/2002 | Price |
| 6,400,809 | B1 | 6/2002 | Bossemeyer, Jr. et al. |
| 6,400,947 | B1 | 6/2002 | Bright et al. |
| 6,404,868 | B1 | 6/2002 | Beamish et al. |
| 6,404,875 | B2 | 6/2002 | Malik et al. |
| 6,411,692 | B1 | 6/2002 | Scherer |
| 6,421,425 | B1 | 7/2002 | Bossi et al. |
| 6,422,263 | B1 | 7/2002 | Spicer |
| 6,427,003 | B1 | 7/2002 | Corbett et al. |
| 6,427,064 | B1 | 7/2002 | Henderson |
| 6,434,394 | B1 | 8/2002 | Grundvig et al. |
| 6,437,879 | B1 | 8/2002 | Temple |
| 6,438,216 | B1 | 8/2002 | Aktas |
| 6,438,217 | B1 | 8/2002 | Huna |
| 6,438,584 | B1 | 8/2002 | Powers |
| 6,442,249 | B1 | 8/2002 | Miller, Jr. |
| 6,442,262 | B1 | 8/2002 | Moss et al. |
| 6,442,263 | B1 | 8/2002 | Beaton et al. |
| 6,442,283 | B1 | 8/2002 | Tewfik et al. |
| 6,445,781 | B1 | 9/2002 | Heinmiller et al. |
| 6,449,351 | B1 | 9/2002 | Moss et al. |
| 6,449,361 | B1 | 9/2002 | Okuda |
| 6,462,646 | B2 | 10/2002 | Helferich |
| 6,466,653 | B1 | 10/2002 | Hamrick et al. |
| 6,477,246 | B1 | 11/2002 | Dolan et al. |
| 6,480,589 | B1 | 11/2002 | Lee et al. |
| 6,483,898 | B2 | 11/2002 | Lew et al. |
| 6,493,430 | B2 | 12/2002 | Leuca et al. |
| 6,493,431 | B1 | 12/2002 | Troen-Krasnow et al. |
| 6,493,437 | B1 | 12/2002 | Olshansky |
| 6,493,439 | B2 | 12/2002 | Lung et al. |
| 6,494,953 | B2 | 12/2002 | Hayes et al. |
| 6,496,569 | B2 | 12/2002 | Pelletier et al. |
| 6,496,571 | B1 | 12/2002 | Wilson |
| 6,496,692 | B1 | 12/2002 | Shanahan |
| 6,498,841 | B2 | 12/2002 | Bull et al. |
| 6,507,737 | B1 | 1/2003 | Laham et al. |
| 6,529,500 | B1 | 3/2003 | Pandharipande |
| 6,529,591 | B1 | 3/2003 | Dosani et al. |
| 6,532,490 | B1 | 3/2003 | Lewis et al. |
| 6,539,080 | B1 | 3/2003 | Bruce et al. |
| 6,542,583 | B1 | 4/2003 | Taylor |
| 6,542,586 | B1 | 4/2003 | Helstab |
| 6,542,591 | B1 | 4/2003 | Amro et al. |
| 6,542,602 | B1 | 4/2003 | Elazar |
| 6,542,812 | B1 | 4/2003 | Obradovich et al. |
| 6,546,092 | B2 | 4/2003 | Corbett et al. |
| 6,549,621 | B1 | 4/2003 | Christie, IV et al. |
| 6,553,110 | B1 | 4/2003 | Peng |
| 6,553,221 | B2 | 4/2003 | Nakamura et al. |
| 6,556,540 | B1 | 4/2003 | Mawhinney et al. |
| 6,560,317 | B1 | 5/2003 | Quagliana |
| 6,560,327 | B1 | 5/2003 | McConnell |
| 6,566,995 | B2 | 5/2003 | Furuuchi et al. |
| 6,570,971 | B2 | 5/2003 | Latter et al. |
| 6,570,974 | B1 | 5/2003 | Gerszberg et al. |
| 6,574,319 | B2 | 6/2003 | Latter et al. |
| 6,580,904 | B2 | 6/2003 | Cox et al. |
| 6,584,490 | B1 | 6/2003 | Schuster et al. |
| 6,587,458 | B1 | 7/2003 | Burg et al. |
| 6,590,970 | B1 | 7/2003 | Cai et al. |
| 6,597,905 | B1 | 7/2003 | Hijii |
| 6,603,840 | B2 | 8/2003 | Fellingham et al. |
| 6,603,854 | B1 | 8/2003 | Judkins et al. |
| 6,608,891 | B1 | 8/2003 | Pelletier et al. |

| | | |
|---|---|---|
| 6,618,474 B1 | 9/2003 | Reese |
| 6,625,595 B1 | 9/2003 | Anderson et al. |
| 6,631,181 B1 | 10/2003 | Bates et al. |
| 6,633,633 B1 | 10/2003 | Bedingfield |
| 6,639,979 B1 | 10/2003 | Kim |
| 6,650,743 B2 | 11/2003 | Heinmiller et al. |
| 6,659,597 B2 | 12/2003 | Murata et al. |
| 6,661,785 B1 | 12/2003 | Zhang et al. |
| 6,665,378 B1 | 12/2003 | Spielman et al. |
| 6,665,388 B2 | 12/2003 | Bedingfield |
| 6,665,715 B1 | 12/2003 | Houri |
| 6,675,008 B1 | 1/2004 | Paik et al. |
| 6,683,870 B1 | 1/2004 | Archer |
| 6,687,341 B1 | 2/2004 | Koch et al. |
| 6,697,357 B2 | 2/2004 | Emerson, III |
| 6,701,160 B1 | 3/2004 | Pinder et al. |
| 6,718,021 B2 | 4/2004 | Crockett et al. |
| 6,721,407 B1 | 4/2004 | Michelena |
| 6,724,872 B1 | 4/2004 | Moore et al. |
| 6,725,872 B2 | 4/2004 | Kindell et al. |
| 6,728,355 B2 | 4/2004 | Kowalski |
| 6,728,360 B1 | 4/2004 | Brennan |
| 6,728,365 B1 | 4/2004 | Li et al. |
| 6,731,727 B2 | 5/2004 | Corbett et al. |
| 6,732,188 B1 | 5/2004 | Flockhart et al. |
| 6,757,530 B2 | 6/2004 | Rouse et al. |
| 6,757,732 B1 | 6/2004 | Sollee et al. |
| 6,757,740 B1 | 6/2004 | Parekh et al. |
| 6,765,998 B2 | 7/2004 | Bruce et al. |
| D494,953 S | 8/2004 | Leung |
| 6,771,956 B1 | 8/2004 | Beeler |
| 6,775,366 B1 | 8/2004 | Cobbett et al. |
| 6,775,371 B2 | 8/2004 | Elsey et al. |
| 6,775,540 B2 | 8/2004 | Iyer |
| 6,778,524 B1 | 8/2004 | Augart |
| 6,779,020 B1 | 8/2004 | Henrick |
| 6,785,301 B1 | 8/2004 | Chapman et al. |
| 6,785,368 B1 | 8/2004 | Eason et al. |
| 6,785,540 B1 | 8/2004 | Wichelman |
| 6,792,266 B1 | 9/2004 | Masuda et al. |
| 6,798,841 B2 | 9/2004 | Hansen |
| 6,798,876 B1 | 9/2004 | Bala |
| 6,798,879 B1 | 9/2004 | Beham |
| 6,804,503 B2 | 10/2004 | Shohara et al. |
| 6,807,267 B2 | 10/2004 | Moss et al. |
| 6,810,077 B1 | 10/2004 | Dezonno |
| 6,810,115 B2 | 10/2004 | Fukuda |
| 6,813,344 B1 | 11/2004 | Lemke |
| 6,816,481 B1 | 11/2004 | Adams et al. |
| 6,818,474 B2 | 11/2004 | Kim et al. |
| 6,826,617 B1 | 11/2004 | Ansell et al. |
| 6,826,871 B2 | 12/2004 | Morton et al. |
| 6,829,348 B1 | 12/2004 | Schroeder et al. |
| 6,830,595 B2 | 12/2004 | Reynolds, III |
| 6,831,974 B1 | 12/2004 | Watson et al. |
| 6,842,512 B2 | 1/2005 | Pedersen |
| 6,845,151 B2 | 1/2005 | Peng |
| 6,845,512 B2 | 1/2005 | Horng et al. |
| 6,853,710 B2 | 2/2005 | Harris |
| 6,853,711 B2 | 2/2005 | Brisebois et al. |
| 6,856,677 B2 | 2/2005 | Leijonhufvud |
| 6,859,527 B1 | 2/2005 | Banks et al. |
| 6,865,266 B1 | 3/2005 | Pershan |
| 6,865,384 B2 | 3/2005 | Sagi et al. |
| 6,868,155 B1 | 3/2005 | Cannon et al. |
| 6,870,924 B1 | 3/2005 | Ukon |
| 6,871,076 B2 | 3/2005 | Samn |
| 6,888,927 B1 | 5/2005 | Cruickshank et al. |
| 6,888,972 B2 | 5/2005 | Berg et al. |
| 6,891,940 B1 | 5/2005 | Bhandari et al. |
| 6,898,275 B2 | 5/2005 | Dolan et al. |
| 6,904,137 B2 | 6/2005 | Brandt et al. |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,922,411 B1 | 7/2005 | Taylor |
| 6,928,154 B1 | 8/2005 | Cheaito et al. |
| 6,931,007 B2 | 8/2005 | Jones |
| 6,947,531 B1 | 9/2005 | Lewis et al. |
| 6,952,469 B2 | 10/2005 | Han |
| 6,970,546 B2 | 11/2005 | Kent, Jr. et al. |
| 6,977,993 B2 | 12/2005 | Starbuck et al. |
| 6,996,211 B2 | 2/2006 | Reynolds et al. |
| 7,012,999 B2 | 3/2006 | Ruckart |
| 7,016,482 B2 | 3/2006 | Moss et al. |
| 7,020,250 B2 | 3/2006 | Lew et al. |
| 7,027,408 B2 | 4/2006 | Nabkel et al. |
| 7,027,569 B2 | 4/2006 | Price |
| 7,076,051 B2 | 7/2006 | Brown et al. |
| 7,079,837 B1 | 7/2006 | Sherman et al. |
| 7,085,257 B1 * | 8/2006 | Karves et al. ............... 370/352 |
| 7,085,358 B2 | 8/2006 | Ruckart et al. |
| 7,085,578 B2 | 8/2006 | Barclay et al. |
| 7,095,715 B2 | 8/2006 | Buckman et al. |
| 7,097,169 B2 | 8/2006 | Mueller |
| 7,103,167 B2 | 9/2006 | Brahm et al. |
| 7,103,662 B2 | 9/2006 | Ray et al. |
| 7,107,077 B2 | 9/2006 | Lee |
| 7,113,577 B2 | 9/2006 | Cook et al. |
| 7,127,488 B1 | 10/2006 | Scott et al. |
| 7,139,374 B1 | 11/2006 | Scott et al. |
| 7,152,118 B2 | 12/2006 | Anderson, IV et al. |
| 7,155,211 B2 | 12/2006 | Mun et al. |
| 7,184,533 B1 | 2/2007 | Shaffer et al. |
| 7,228,129 B1 | 6/2007 | Ward et al. |
| 7,254,226 B1 | 8/2007 | Roberts et al. |
| 7,257,210 B1 | 8/2007 | Henderson |
| 7,313,227 B2 | 12/2007 | Jones |
| 7,631,047 B1 | 12/2009 | Adamczyk et al. |
| 2001/0002209 A1 | 5/2001 | Han |
| 2001/0005854 A1 | 6/2001 | Murata et al. |
| 2001/0036174 A1 | 11/2001 | Herring |
| 2001/0044898 A1 | 11/2001 | Benussi et al. |
| 2001/0048737 A1 | 12/2001 | Goldberg et al. |
| 2002/0007400 A1 | 1/2002 | Pedersen |
| 2002/0009184 A1 * | 1/2002 | Shnier ................ 379/142.01 |
| 2002/0016748 A1 | 2/2002 | Emodi et al. |
| 2002/0023265 A1 * | 2/2002 | Metcalf ........................ 725/74 |
| 2002/0041605 A1 | 4/2002 | Benussi et al. |
| 2002/0055926 A1 | 5/2002 | Dan et al. |
| 2002/0067816 A1 | 6/2002 | Bushnell |
| 2002/0077102 A1 | 6/2002 | Achuthan et al. |
| 2002/0082050 A1 | 6/2002 | Mountney et al. |
| 2002/0085687 A1 | 7/2002 | Contractor et al. |
| 2002/0091777 A1 | 7/2002 | Schwartz |
| 2002/0118812 A1 | 8/2002 | Contractor |
| 2002/0119430 A1 | 8/2002 | Szynalski |
| 2002/0120629 A1 | 8/2002 | Leonard |
| 2002/0122401 A1 | 9/2002 | Xiang et al. |
| 2002/0125929 A1 | 9/2002 | Chen et al. |
| 2002/0171581 A1 | 11/2002 | Sheynblat et al. |
| 2002/0172338 A1 | 11/2002 | Lee et al. |
| 2002/0183098 A1 * | 12/2002 | Lee et al. .................... 455/566 |
| 2002/0188443 A1 | 12/2002 | Reddy et al. |
| 2002/0197991 A1 | 12/2002 | Anvekar et al. |
| 2003/0002633 A1 | 1/2003 | Kredo et al. |
| 2003/0006912 A1 | 1/2003 | Brescia |
| 2003/0012353 A1 | 1/2003 | Tang |
| 2003/0016143 A1 | 1/2003 | Ghazarian |
| 2003/0016800 A1 | 1/2003 | Fukuda |
| 2003/0026416 A1 | 2/2003 | Fusco |
| 2003/0032414 A1 | 2/2003 | Melaku |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0065776 A1 | 4/2003 | Malik et al. |
| 2003/0068020 A1 | 4/2003 | Hamrick |
| 2003/0092384 A1 | 5/2003 | Ross, III |
| 2003/0092432 A1 | 5/2003 | Hwang |
| 2003/0103608 A1 | 6/2003 | Pearson et al. |
| 2003/0112938 A1 | 6/2003 | Kanakubo et al. |
| 2003/0119522 A1 | 6/2003 | Barclay et al. |
| 2003/0133553 A1 | 7/2003 | Khakoo et al. |
| 2003/0133653 A1 | 7/2003 | Barros et al. |
| 2003/0135562 A1 | 7/2003 | Himmel et al. |
| 2003/0148758 A1 | 8/2003 | McMullin |

| | | | |
|---|---|---|---|
| 2003/0152207 | A1 | 8/2003 | Ryan |
| 2003/0187949 | A1 | 10/2003 | Bhatt et al. |
| 2003/0193967 | A1 | 10/2003 | Fenton et al. |
| 2003/0196206 | A1 | 10/2003 | Shusman |
| 2003/0198322 | A1 | 10/2003 | White, Jr. |
| 2003/0219107 | A1 | 11/2003 | Richardson et al. |
| 2004/0049545 | A1 | 3/2004 | Lockridge et al. |
| 2004/0101118 | A1 | 5/2004 | Powell |
| 2004/0101124 | A1 | 5/2004 | Koch et al. |
| 2004/0109558 | A1 | 6/2004 | Koch |
| 2004/0114603 | A1 | 6/2004 | Suhail et al. |
| 2004/0114730 | A1 | 6/2004 | Koch et al. |
| 2004/0120475 | A1 | 6/2004 | Bauer et al. |
| 2004/0125929 | A1 | 7/2004 | Pope |
| 2004/0171370 | A1 | 9/2004 | Natarajan |
| 2004/0181587 | A1 | 9/2004 | Cao et al. |
| 2004/0202298 | A1 | 10/2004 | Lopez et al. |
| 2004/0202299 | A1 | 10/2004 | Schwartz |
| 2004/0208301 | A1 | 10/2004 | Urban et al. |
| 2004/0208302 | A1 | 10/2004 | Urban et al. |
| 2004/0209604 | A1 | 10/2004 | Urban et al. |
| 2004/0209605 | A1 | 10/2004 | Urban et al. |
| 2004/0209640 | A1 | 10/2004 | Urban et al. |
| 2004/0213207 | A1 | 10/2004 | Silver et al. |
| 2004/0233892 | A1 | 11/2004 | Roberts et al. |
| 2004/0242212 | A1 | 12/2004 | Bacon et al. |
| 2004/0248560 | A1 | 12/2004 | Bedingfield, Sr. |
| 2005/0068166 | A1 | 3/2005 | Baker |
| 2005/0073999 | A1 | 4/2005 | Koch |
| 2005/0100158 | A1 | 5/2005 | Kreiner et al. |
| 2005/0107074 | A1 | 5/2005 | Zellner |
| 2005/0147228 | A1 | 7/2005 | Perrella et al. |
| 2006/0002540 | A1 | 1/2006 | Kreiner et al. |
| 2006/0013375 | A1 | 1/2006 | Smith et al. |
| 2006/0029209 | A1 | 2/2006 | Moton et al. |
| 2006/0062374 | A1 | 3/2006 | Gupta |
| 2006/0152207 | A1 | 7/2006 | Riebel et al. |
| 2006/0153173 | A1 | 7/2006 | Beck et al. |
| 2007/0064911 | A1 | 3/2007 | Bedingfield, Sr. et al. |

FOREIGN PATENT DOCUMENTS

| | | |
|---|---|---|
| KR | 2002014945 | 2/2002 |
| WO | 03/030501 A1 | 4/2003 |
| WO | 03/030502 A1 | 4/2003 |
| WO | 03/090432 A1 | 10/2003 |

OTHER PUBLICATIONS

Address Allocation for Private Internets, Rekhter et al., pp. 1-8, Feb. 1996.

Bellcore Specification TR-NWT-000310, Calling Number Delivery, Issue 4, Dec. 1992.

Bellcore Specification TR-NWT-001188, Calling Name Delivery Generic Requirements, Issue 1, Dec. 1991.

T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.

J. Boswell, G. Lingenauber, An Advanced HF Receiver Design, Jul. 1994, IEE, Conference Publication. No. 392, pp. 41-47*.

Mark H. Norris, Transmitter Architectures, 1998, IEE, pp. 4/1-4/6*.

OKI Silicon Processor the Internet Solutions Company, Japan Site, "Multi-Lingual Text-to-Speech ML2110;" [online]; [retrieved on Aug. 31, 2005] retrieved from the Internet http://www.//oki.com/semi/English/m12110/htm.

RBS 884 Pico System Description, Author Unknown, Ericsson 1/1551-AE/LZB 119 2269 Uae Rev A, Apr. 23, 1998.

SIP: Session Initiation Protocol, Handley et al., Mar. 1999*.

Slawson, "Caller Id Basics;" [online]; [retrieved on Oct. 31, 2001]; retrieved from the Internet http://www.testmark.com/develop/tml_callerid_cnt.html.

SmartHome "The Caller ID System that Speaks for Itself!;" [online]; [retrieved on Aug. 31, 2005]; retrieved from the Internet http://www.smarthome.com/5154.html SmartHome "The Caller ID System that Speaks of Itself! Talking Caller ID;" [online]; [retrieved on Nov. 5, 2001]; retrieved from the Internet http://www.smarthome.com/5154.html.

"Talking Caller Id by Stealth Software;" [online]; [retrieved on Nov. 5, 2001]; retrieved from the Internet http://www.talkingcallerid.com/.

The IP Network Address Translator (NAT, Egevang et al., May 1994*.

"Time Division Multiple Access (TDMA);" [online]; [retrieved on Mar. 6, 2003]; retrieved from the Internet http://www.iec.org/online/tutorials/tdma/.

"Venture IP Telephone System" AASTRA [online]; [retrieved on Aug. 31, 2001]; retrieved from the Internet http://www.aastra.com/products/callerids/voicecallerid/be-6060.html.

"Venture IP Telephone System" AASTRA; [online]; [retrieved on Nov. 5, 2001]; retrieved from the Internet http://www.aastra.com/products/callerids/voicecallerid/be-6090.html.

"Voice-9090 Talking Caller ID", Aastra Telecom-Talking Caller ID-Voice 9090, [online]; [retrieved on Nov. 5, 2001]; http://www.aastra.com/products/callerids/voicecallerid/be-9090.html.

International Search Report PCT/US02/30068, Dec. 9, 2002.

International Search Report PCT/US02/29988, Sep. 23, 2002.

U.S. Appl. No. 10/032,724, filed Dec. 27, 2001 Harold et al.

U.S. Appl. No. 10/200,906, filed Jul. 23, 2002 Scott et el.

U.S. Appl. No. 10/144,555, filed May 13, 2002 Koch at al.

U.S. Appl. No. 10/144,556, filed May 13, 2002 Koch et al.

U.S. Appl. No. 10/152,544, filed May 21, 2002 Alston at al.

U.S. Appl. No. 10/200,874, filed Jul. 23, 2002 Scott et al.

U.S. Appl. No. 09/812,338, filed Mar. 19, 2001 Smith.

* cited by examiner

VISUAL CALLER IDENTIFICATION

CROSS-REFERENCE TO RELATED APPLICATIONS

This patent application is a continuation of U.S. patent application Ser. No. 09/888,832, entitled "VISUAL CALLER IDENTIFICATION," filed Jun. 25, 2001 now U.S. Pat. No. 7,085,358, and assigned to the same assignee as this application. The aforementioned patent application is expressly incorporated herein by reference.

TECHNICAL FIELD

This invention generally relates to telephony-based caller identification systems and methods, and more particularly, relates to a system and method for providing visual caller identification.

BACKGROUND OF THE INVENTION

In recent years a growing number of telephone services have become available to users of telephone services. Such services include, for example, call forwarding, call waiting, conferencing, and caller identification.

Caller identification, or Caller ID, has become particularly popular as it allows called parties a certain degree of call screening prior to answering a call. In a typical case, the called party's telephone has a caller ID screen or a stand-alone attached caller ID device. When the called party receives a call, caller identification information on the calling party, including the date and time of the call, and often the name and number of the calling party, is displayed on the screen of the called party's caller ID device.

Typically, the called party receives the call, and the called party must rush to the telephone to determine who is calling by reading the caller ID screen on the called party's caller ID device. Most often, one of three caller identifications is provided to the called party. One, the identification is a name and/or number known to the caller, for example, a friend, family member, or associate. Two, the identification is a name and/or number unknown to the called party, or three, no name or number is provided, and the screen reads "private," "unlisted," "out of area," or the like. For called parties who are hearing impaired, the problem is greater because the hearing impaired party first must be alerted to the ringing telephone by an alarm, such as a flashing light, before the hearing impaired party can rush to the telephone to read the caller ID screen.

It is with respect to these considerations and others that the present invention has been made.

SUMMARY OF THE INVENTION

In accordance with the present invention, the above and other problems are solved by a visual caller identification system and method. A caller identification device of a called party's telephone, whether integrated with the telephone or standalone, includes a series of lights for visually alerting the called party to an incoming call. The called party may program the caller identification device so that a first light illuminates any time the caller ID identifies a name and/or number known to the called party. A second light illuminates any time a name and/or number are provided, but are unknown to the called party. And, a third light illuminates any time the caller identification is not provided (e.g., private, unlisted, etc.).

When the telephone begins to ring, the called party may look at the telephone for a quick screening without having to go to the telephone to read the caller ID. If the first light flashes, the called party knows that the incoming call is from a known party. If the second light flashes, the called party knows that the calling party will be identified if the called party goes to the telephone to read the caller ID. And, if the third light flashes, the called party knows that no caller identification information is available for the incoming call.

Preferably, the called party saves one or more known directory numbers for comparison with the directory number of a calling party. The numbers may be saved by typing known directory numbers using a standard telephone keypad or the called party may save numbers as the called party receives calls. The comparison is performed by the caller identification device when it receives caller identification information on the calling party for display. Alternatively, the comparison may be performed by network software of a telephone network in which the called party's caller identification device operates.

According to an aspect of the invention, the first light may be colored green, the second light may be colored yellow, the third light may be colored red, and each of the lights may flash when illuminated to provide better visual effect. Alternatively, each light may be the same color, and each of the three lights may flash with a different distinctive flash sequence.

According to another aspect of the invention, caller identification information to be displayed on the called party's caller ID device, or user programmed information associated with a particular directory number may be projected onto a projection surface, such as a wall in the called party's home or office.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE INVENTION

Figure 1:
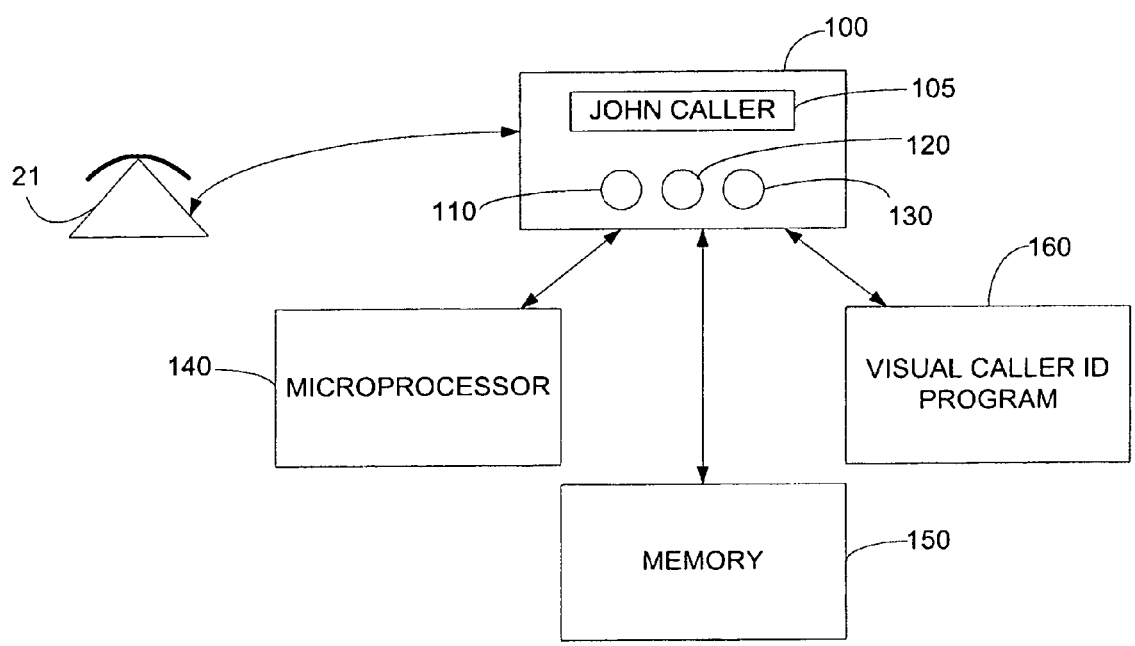
FIG. 1 is a block diagram illustrating the system architecture of an exemplary embodiment of the present invention.

In accordance with an exemplary embodiment of the present invention, a visual caller identification system and method are provided. The caller ID device, whether integrated with the telephone or stand-alone, includes a series of colored lights for visually alerting the called party to an incoming call. The device may be programmed such that a first light, for example green, flashes when the caller ID identifies a name or number known to the called party. A second light, for example yellow, flashes when the name and/or number is/are provided, but are unknown to the called party. And, a third light, for example red, flashes when the caller identification is not provided (e.g., private, unlisted, etc.). With this information, the called party can decide whether she should answer the call, allow the call to be directed to voice mail, or whether the call may be disregarded altogether. The functionality of the present invention is particularly useful for hearing impaired parties who may use visual caller identification to alert them to the call and to provide them useful information as to the nature of the call. Referring now to the drawings, in which like numerals represent like elements throughout the several figures, aspects of the present invention will be described.

Caller ID is well known to those skilled in the art as a system and method for displaying to called parties information about a calling party. In the typical setting, a user of caller ID has a caller identification screen integrated with her telephone set or integrated into a caller ID box connected to a telephone set as a stand alone unit. Caller identification information may be transmitted to the called party for presentation on her caller ID device using a variety of known methods. One known method uses frequency shift keyed (FSK) modem tones. The FSK modem tones are used to transmit the display message in standard ASCII character code form, and typically the transmission of the display message takes place between the first and second ring of the user's telephone set. The information sent to the user most often includes the calling number and the date and time of the call. In some situations, the name of the calling party is also included.

FIG. 1 is a block diagram illustrating the system architecture of an exemplary embodiment of the present invention. As shown in FIG. 1, a telephone set 21 is provided, and connected to the telephone set 21 is a caller identification box 100. Alternatively, the caller identification functionality of the caller ID box 100 may be integrated with the telephone set 21. The caller ID box 100 includes a display screen 105 for display of caller identification information, such as the name, number, date, time, etc., for an incoming telephone call. According to a preferred embodiment, the caller ID box 100 includes a green light 110, a yellow light 120, and a red light 130 for visually identifying incoming telephone calls as described above.

Also illustrated in FIG. 1 are a microprocessor 140, memory 150, and a 5 visual caller ID program 160. According to an exemplary embodiment, the microprocessor 140 is resident in the caller ID box 100 for processing information coming into the caller ID box 100 as well as accepting and processing instructions contained in the visual caller ID program 160. According to a preferred embodiment, the user of the caller ID box 100 may enter into memory 150, through the telephone keypad of the telephone set 21, a list of telephone numbers associated with known parties, such as friends, family members, associates or anyone for whom the user would like to be notified of as a known caller by the visual caller identification system of the present invention.

When the user of the caller ID box 100 receives a call on her telephone set 21, the microprocessor 140 calls on the functionality of the visual caller ID program 160 to provide visual caller identification for the user as the called party. The visual caller ID program 160 receives the telephone number of the calling party and compares that number with the numbers stored in memory 150 for which the user has designated for visual notification. For any telephone number received by the user at her telephone set 21 that matches one of the numbers entered into memory 150 by the user, the visual caller ID program 160 causes the green light 110 to flash intermittently to notify the user that the calling party is associated with one of the numbers programmed into memory 150 by the user. If the telephone number received by the caller ID box 100 does not match one of the numbers programmed into memory 150 by the user, the visual caller ID program will cause the yellow light 120 to flash intermittently. Finally, if no telephone number is available, as in the case wherein the calling party's number is designated as private, unlisted, or out of the calling area, the visual caller ID program 160 will cause the red light 130 to flash intermittently. It should be understood that the lights 110, 120, 130 may be illuminated steadily without flashing, if desired.

Alternatively, visual caller identification information may be provided to the called party in other forms including a flashing light. For example, a single flashing light can be used to indicate that the calling party is associated with one of the telephone numbers entered into memory 150 by having a single light flash intermittently in a flash/pause/flash sequence. Where caller identification information is provided, but not associated with one of the telephone numbers entered into memory 150 by the called party, a flashing sequence such as flash/flash/pause may be provided to the called party.

Figure 1A:
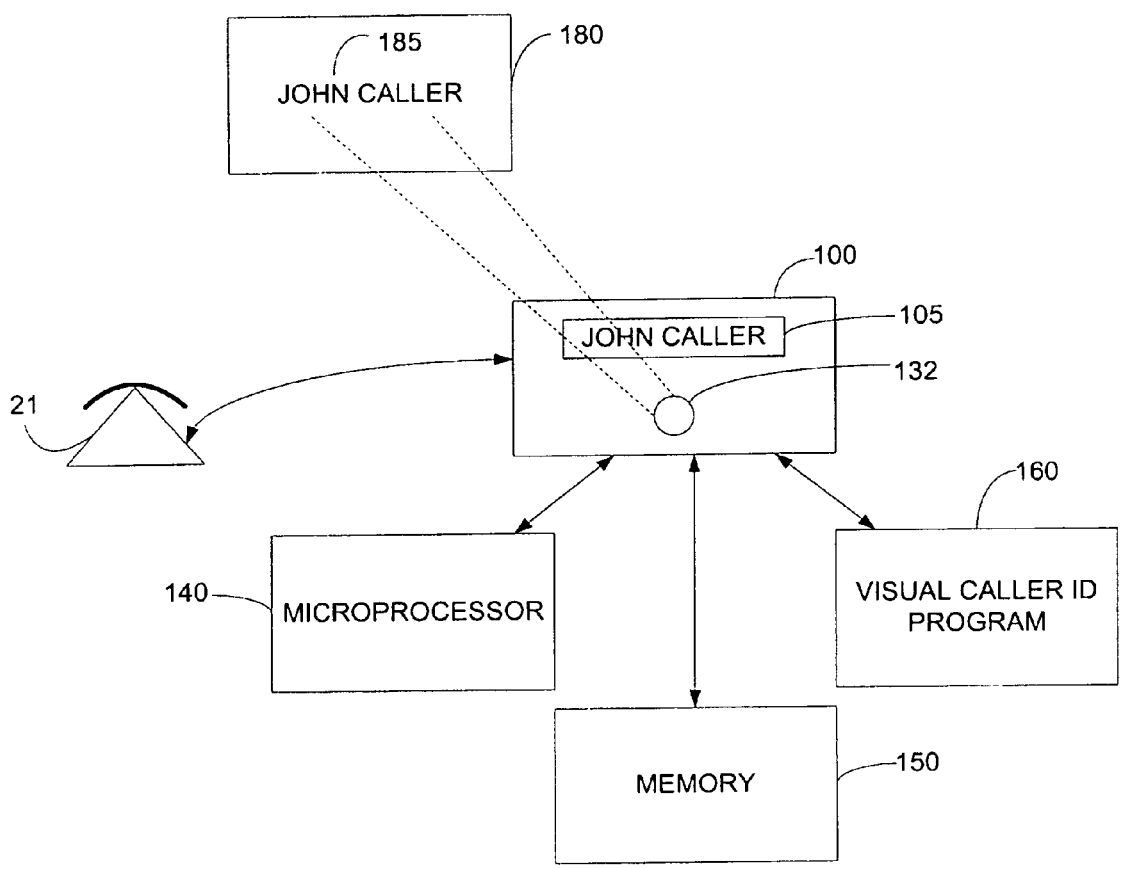
FIG. 1a is a block diagram illustrating the system architecture of an alternative embodiment of the present invention.

Finally, where no caller identification information is provided, a flashing sequence such as flash/flash/flash/pause may be provided to the called party. According to another alternative embodiment illustrated in FIG. 1a, when the called party receives a call, the caller identification information to be displayed on the display 105 of the called party's caller ID box 100 is projected onto a projection surface 180, such as a wall in the called party's home or office. It should be understood that the information to be displayed on the display 105 may include the calling party's name, telephone number, or where that information is not available, the information projected on the projection surface 180 may read "Private", "Out of the Area", or the like. Referring still to FIG. 1a, the caller ID box 100 includes a projection device (not shown) for projecting caller identification information 185 through a projection orifice 132 onto the projection surface 180. The projection device may be any suitable projection device for projecting information onto a surface, such as well known projection devices used for slide presentations operated from digital electronic devices, such as computers.

According to the alternative embodiment, when the called party caller ID box 100 receives a call on a telephone set 21, the microprocessor 140 calls on the functionality of the visual caller ID program 160, as described above with reference to FIG. 1. The visual caller ID program receives the caller identification information to be displayed on the display 105, and the visual caller ID program 160 directs the projection device to project the information to be displayed in the display 105 onto a nearby projection surface 180, as illustrated in FIG. 1a. It should be understood that the caller identification box 100 must be positioned in a way that allows the projection information 185 to be properly projected onto a nearby projection surface 180.

As with the embodiment described with reference to FIG. 1, the called party may enter into memory 150, through the telephone keypad of the telephone set 21, a list of telephone numbers associated with known parties, such as friends, family members, associates or anyone for whom the user would like to be notified of as a known caller by the visual caller identification system. In addition, the called party may program projection information associated with certain telephone numbers for projection onto the projection surface 180 when the called party receives a call from that number. For example, the called party may program "Joe is Calling" into memory 150 associated with Joe's directory number so that when the called party receives a call from her friend Joe, the phrase "Joe is calling" will be projected onto the projection surface. If the directory number of a calling party does not match one of the programmed projections, the information otherwise to be displayed in the display 105 may be projected onto the projection surface.

Figure 2:
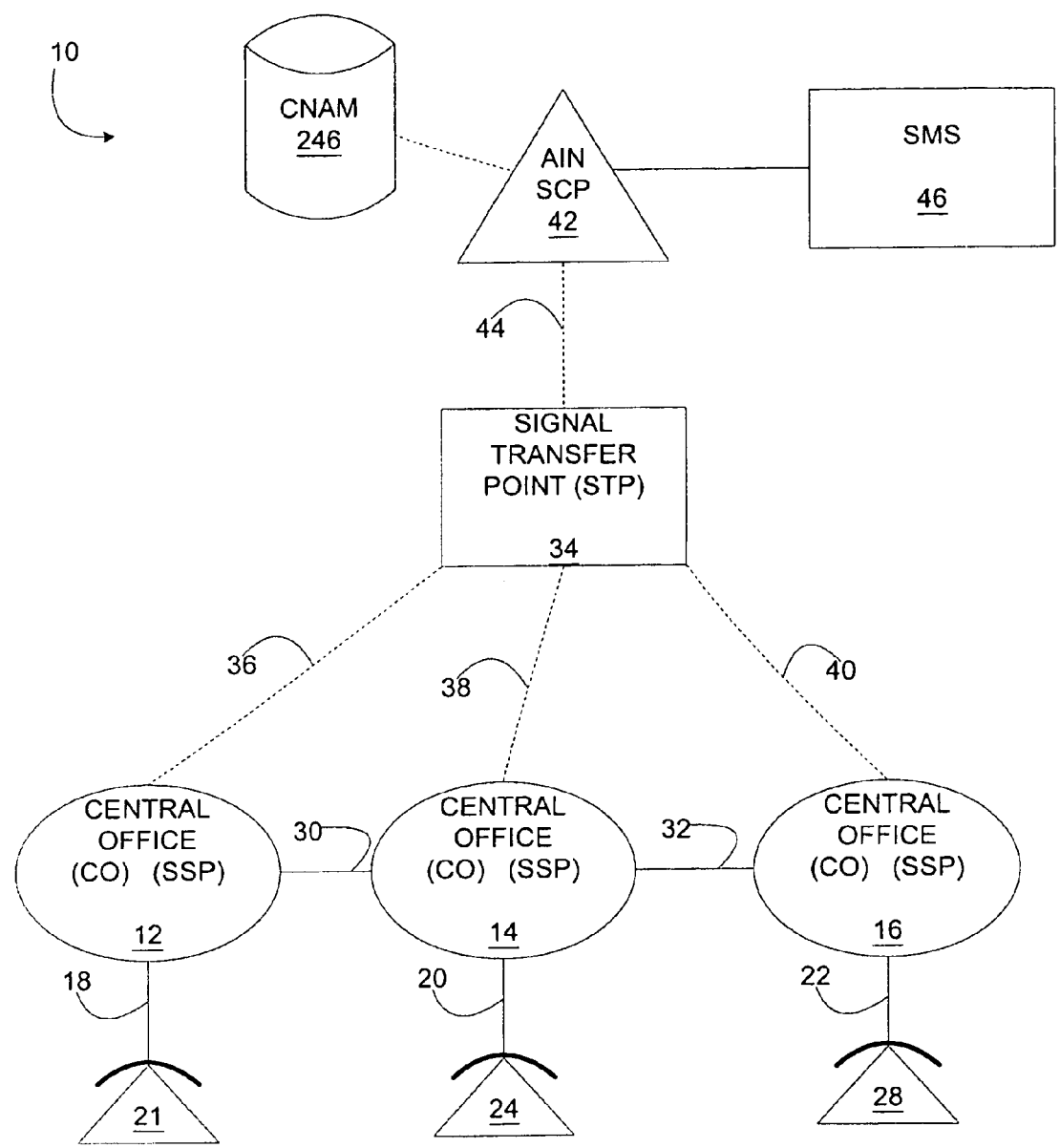
FIG. 2 illustrates a telephone network that provides an exemplary operating environment of the present invention.

FIG. 2 is a block diagram illustrating an exemplary operating environment for an embodiment of the present invention and includes a general description of a modem public switch telephone network through which the present invention preferably operates. The modem public switched telephone network (PSTN) has separate signaling paths for voice signals (or other customer-utilized communication circuits) and for control signals, which include information transmitted throughout the network to control the connection and disconnection of the voice circuits. In the late 1970s and early 1980s, American Telephone & Telegraph Company (AT&T) developed an early species of common channel interoffice signaling (CCIS).

CCIS is essentially a network architecture for a switched telephone network in which information about a telephone call is transmitted over high speed data links that are separate from the voice circuits that are used to transmit the signals of the call itself.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 10 of a typical local exchange carrier. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-10000246, Issue 2 (June 1991), plus Revision 1 (December 1991), which is also incorporated herein by reference.

Referring still to FIG. 2, a plurality of central offices is provided in a typical public switched telephone network. Each central office may include an electronic switch known to those skilled in the art as a service switching point (SSP). These are indicated in FIG. 2 as SSP switches 12, 14, and 16. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

Central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by pay telephone 21 and standard telephone sets 24 and 28. SSP switches 12, 14, and 16 are connected by a plurality of trunk circuits indicated as 30 and 32 in FIG. 2. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 2.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services. The AIN SCP 42 is also connected to a caller ID with name (CNAM) database 246. The CNAM database comprises a plurality of directory numbers along with associated names for the directory numbers. The CNAM database may be used to provide a look-up database to provide caller ID service. According to an alternate embodiment of the present invention, caller identification information stored into memory 150 by the called party, may be stored in the AIN SCP 42 or in the CNAM database 246 or other AIN data storage device accessible by the SCP 42 for provision to the caller ID box 100 of the present invention.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are known to those skilled in the art and will not be further described herein. For more information regarding the AIN protocol, see Bellcore Specification GR-1298-CORE Switching Systems Generic Requirements for AIN 0.1, which is incorporated herein by reference.

Figure 3:
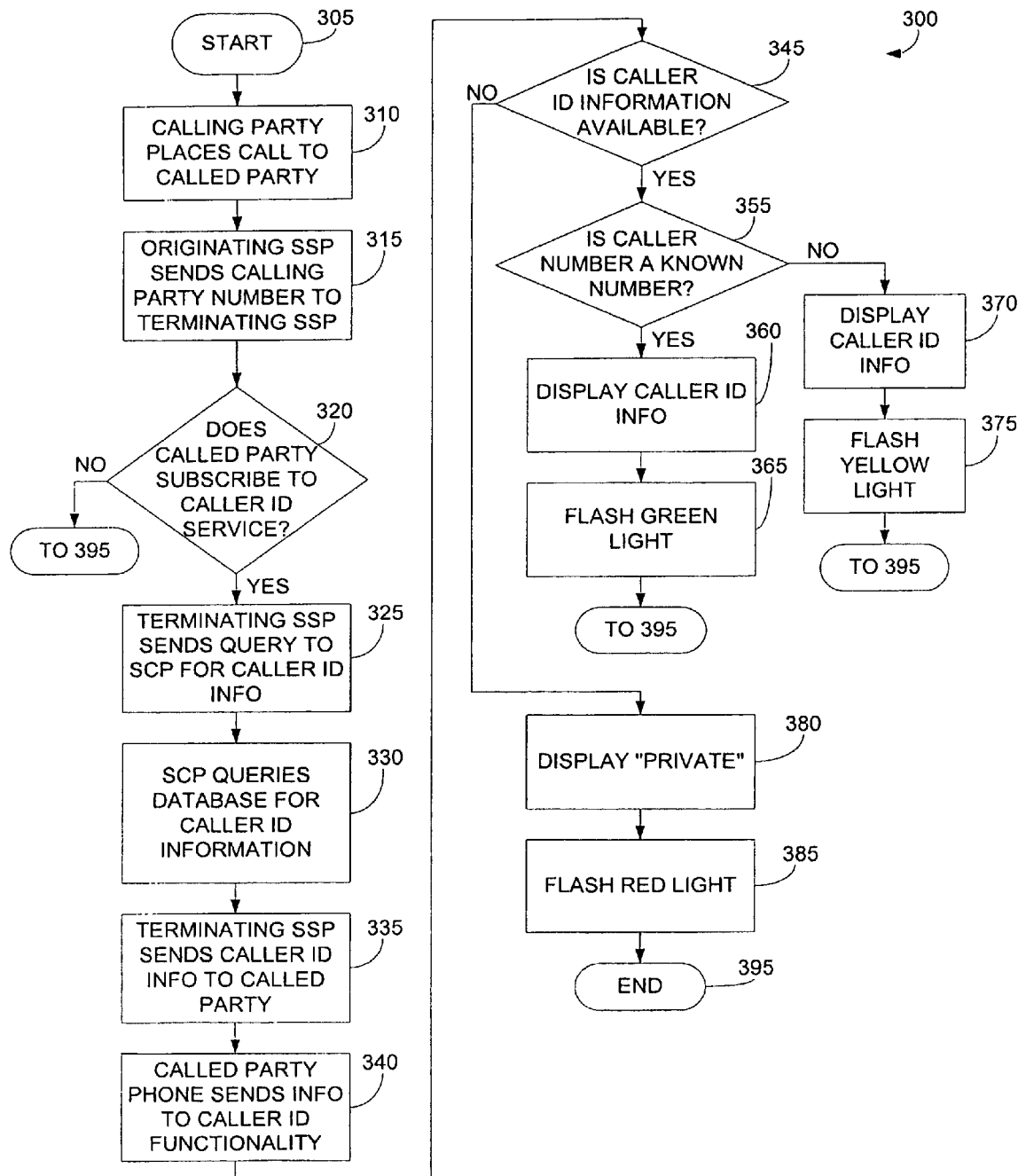
FIG. 3 illustrates an operational flow of the steps performed by the system and method of the present invention in providing visual caller identification.

Having described an exemplary operating environment above in reference to FIG. 2, a flow diagram illustrating a method 300 for providing visual caller identification service to a user of caller ID services in accordance with an embodiment of the present invention will be described with reference to FIGS. 1, 2 and 3. For purposes of the exemplary call flow, assume the called party has programmed into memory 150 telephone numbers of certain calling parties for whom the called party wishes to receive visual caller identification.

The method 300 begins at start step 305 and moves to step 310 where a calling party using a telephone handset 24 places a call to a called party at telephone set 21, where the called party has subscribed to caller ID services. At step 315, the originating central office switch 14 attempts to set up a call between the telephone set 24 of the calling party and the telephone set 21 of the called party by signaling the terminating switch 12 of the called party.

At step 320, the terminating switch 12 receives the call set up message from the originating switch 14, and the terminating switch 12 sends a message to the AIN SCP 42 to determine call services, including caller ID, to which the called party has subscribed. If the called party at telephone set 21 has not subscribed to caller ID services, the method follows the "No" branch to step 395 and ends. If the called party has subscribed to caller ID services, the method follows the "Yes" branch to step 325 and the terminating switch 12 sends a query to the SCP 42 for caller identification information, if any, associated with the telephone number of the calling party. At step 330, the SCP queries the CNAN database 246 for caller identification information, if any, associated with the telephone number of the calling party. As will be appreciated by those skilled in the art, the SCP may also have to query other SCP's or other databases to obtain caller identification information, if any, associated with the calling party. If the SCP 42 locates caller identification information associated with the telephone number of the calling party, the SCP 42 forwards the caller identification information to the terminating switch 12. If, however, the telephone number of the calling party is marked as private or unlisted, or if the SCP 42 is unable to locate caller identification information associated with the telephone number of the calling party, a message will be forwarded to the terminating switch 12 that the telephone number of the calling party is private, unlisted, or unavailable.

At step 335, the terminating central office switch 12 of the called party attempts to connect a call from the calling party by providing a ring at the telephone set 21. Along with the ring provision, the central office switch 12 provides the caller identification information to the telephone set 21 and to the caller ID box 100, illustrated in FIG. 1.

At step 345, the visual caller ID program 160 at the direction of a microprocessor 140 receives the caller identification information and determines whether caller identification information is available. If not, the method follows the "No" branch to step 380. At step 380 the microprocessor 140 displays "private," "unlisted," "out of the area," or the like, according to the information provided about the telephone number of the calling party. At step 385, the visual caller ID program 160 causes the red light 130 to flash intermittently to indicate that no caller identification information is available for the incoming call. It should be understood that the called party may have been supplied the number of a friend, associate, etc. that is blocked from publication, but that the called party has entered into memory 150 in accordance with the present invention. In such a case, the light may be programmed to flash green in accordance with step 365, but the display will read "private," "unlisted," "out of area," or the like.

Referring back to step 345, if caller identification information is available for the calling party, the method follows the "Yes" branch to step 355, and a determination is made whether the caller identification information for the calling party matches any of the telephone numbers entered by the called party into memory 150. If not, the method follows the "No" branch to step 370, and the caller identification information of the calling party is displayed in the display 105. At step 375, the visual caller ID program 160 causes the yellow light 120 to flash intermittently indicating that the calling party information is available, but that the calling party identification information is not associated with one of the telephone numbers entered into memory 150 by the called party.

Referring back to step 355, if the caller identification information for the calling party does match one of the telephone numbers entered by the called party in memory 150, the method follows the "Yes" branch to step 360. At step 360, the microprocessor 140 causes the caller identification information to be displayed in the display 105. At step 365, the visual caller identification program 160 causes the green light 110 to flash intermittently indicating to the called party that the calling party identification information is associated with one of the telephone numbers entered into memory 150 by the called party. The method proceeds to step 395 and ends.

According to an alternate embodiment, the determination as to whether the caller identification information for the calling party matches any of the telephone numbers entered and stored by the called party may take place at one or more network elements described with reference to FIG. 2. That is, the called party may store known directory numbers at the SCP 42, the CNAM 246, or other network-based data storage medium. After the SCP 42 queries for caller identification information associated with the number of the calling party, that information may be compared to directory numbers stored by the called party. If the caller identification information for the calling party matches any numbers stored by the called party, the SCP 42 sends the caller identification information, along with the match, to the called party's caller ID device for processing in accordance with steps 360 and 365. If caller identification information is available, but no match is found, the SCP 42 sends the information to the called party's caller ID device for processing in accordance with steps 370 and 375. And, if no caller identification information is found for the calling party, the SCP 42 sends the information to the called party's caller ID device for processing in accordance with steps 380 and 385.

As described herein, a system and method are provided for presenting visual caller identification information to a called party to allow the called party to screen incoming telephone calls without the need for the called party to interrupt her activities in order to read the caller identification information provided on her caller identification device. It will be apparent to those skilled in the art that various modifications or variations can be made in the present invention without departing from the scope or spirit of the invention. Other embodiments of the invention will be apparent to those skilled in the art from consideration of the specification and practice of the invention disclosed herein.

The invention claimed is:

1. A method of providing visual caller identification, comprising:
   receiving a call from a calling party at a caller identification device, wherein the call is associated with a directory number;
   querying a database for caller identification information associated with the call, wherein the caller identification information includes the directory number associated with the call and a name associated with the calling party;
   comparing the directory number associated with the call with a plurality of directory numbers; if one of the plurality of directory numbers matches the directory number associated with the call, projecting at least a portion of saved projection information associated with the directory number onto a projection surface in place of the caller identification information associated with the call; and if one of the plurality of directory numbers does not match the directory number associated with the call, projecting the caller identification information associated with the call onto a projection surface.

2. The method of claim 1, further comprising:

if one of the plurality of directory numbers matches the directory number associated with the call, illuminating a first colored light; and displaying the caller identification information on a readable display screen of the caller identification device.

3. The method of claim 2, wherein illuminating a first colored light includes, flashing a green light during displaying the caller identification information.

4. The method of claim 2, further comprising:

if one of the plurality of directory numbers does not match the directory number associated with the call, illuminating a second colored light; and displaying the caller identification information on the readable display screen of the caller identification device.

5. The method of claim 4, wherein illuminating a second colored light includes, flashing a yellow light during displaying the caller identification information.

6. The method of claim 5, further comprising:

if one of the plurality of directory numbers does not match the directory number associated with the call and the directory number associated with the call has no caller identification information, illuminating a third colored light and displaying a message that no caller identification information associated with the call is available.

7. The method of claim 6, wherein illuminating a third colored light includes, flashing a red light during displaying the message.

8. A computer program product comprising a computer-readable medium having control logic stored therein for causing a computer to provide visual caller identification, the control logic comprising computer-readable program code for causing the computer to:

receive a call from a calling party at a caller identification device, wherein the call is associated with a directory number;

query a database for caller identification information associated with the call, wherein the caller identification information includes the directory number associated with the call and a name associated with the calling party;

compare the directory number associated with the call with a plurality of directory numbers;

if one of the plurality of directory numbers matches the directory number associated with the call, project saved projection information associated with the directory number onto a projection surface in place of the caller identification information associated with the call; and if one of the plurality of directory numbers does not match the directory number associated with the call, project the caller identification information associated with the call onto a projection surface.

9. A caller identification device, comprising:

means for saving a plurality of directory numbers;

means for saving visual projection information;

means for receiving a call from a calling party at a caller identification device, wherein the call is associated with a directory number;

means for querying a database for caller identification information associated with the call, wherein the caller identification information includes the directory number associated with the call and a name associated with the calling party;

means for sending the caller identification information to a caller identification device;

means for comparing the directory number associated with the call with the plurality of directory numbers;

means for displaying caller identification information; and means for projecting the saved projection information onto a projection surface.

10. The caller identification device of claim 9 wherein the visual projection information is associated with each of the plurality of directory numbers.

11. The caller identification device of claim 10, further comprising:

if one of the plurality of directory numbers matches the directory number associated with the call, means for projecting the saved projection information associated with the directory number onto a projection surface in place of the caller identification information associated with the call; and if one of the plurality of directory numbers does not match the directory number associated with the call, means for projecting caller identification information associated with the call onto a projection surface.

12. A communications device executing a method of providing visual caller identification, the method comprising:

saving a plurality of directory numbers;

saving visual projection information for each of the plurality of directory numbers;

receiving a call from a calling party at a caller identification device associated with the communications device, wherein the call is associated with a directory number;

querying a database for caller identification information associated with the call, wherein the caller identification information includes the directory number associated with the call and a name associated with the calling party;

sending the caller identification information to the caller identification device;

comparing the directory number associated with the call with the plurality of directory numbers;

if one of the plurality of directory numbers matches the directory number associated with the call, projecting the saved projection information associated with the directory number onto a projection surface in place of the caller identification information associated with the call; and if one of the plurality of directory numbers does not match the directory number associated with the call, projecting caller identification information associated with the call onto a projection surface.

\* \* \* \* \*